United States Patent
Elenes et al.

(10) Patent No.: US 9,001,945 B2
(45) Date of Patent: Apr. 7, 2015

(54) PROVIDING PHASE DIVERSITY COMBINING OF DIGITAL RADIO BROADCAST SIGNALS

(75) Inventors: Javier Elenes, Austin, TX (US); Lokesh Duraiappah, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 646 days.

(21) Appl. No.: 13/162,164

(22) Filed: Jun. 16, 2011

(65) Prior Publication Data

US 2012/0321012 A1    Dec. 20, 2012

(51) Int. Cl.
H04B 7/10    (2006.01)
H04L 1/02    (2006.01)
H04B 7/08    (2006.01)

(52) U.S. Cl.
CPC .................. *H04B 7/0845* (2013.01)

(58) Field of Classification Search
USPC .................. 375/260, 267, 316, 347
See application file for complete search history.

(56) References Cited

U.S. PATENT DOCUMENTS

| | | | |
|---|---|---|---|
| 5,838,742 A * | 11/1998 | Abu-Dayya | 375/347 |
| 6,069,912 A | 5/2000 | Sawahashi et al. | |
| 6,151,372 A * | 11/2000 | Yamamoto | 375/347 |
| 6,236,844 B1 | 5/2001 | Cvetkovic et al. | |
| 6,393,083 B1 | 5/2002 | Beukema | |
| 6,654,340 B1 | 11/2003 | Jones et al. | |
| 6,760,386 B2 | 7/2004 | Li et al. | |
| 7,555,065 B1 | 6/2009 | Lou et al. | |
| 8,351,534 B2 * | 1/2013 | Mussmann et al. | 375/267 |
| 2002/0045432 A1 * | 4/2002 | Yoshida | 455/276.1 |
| 2002/0061051 A1 | 5/2002 | Kitahara | |
| 2002/0131536 A1 | 9/2002 | Veillette | |
| 2002/0172270 A1 | 11/2002 | Whikehart et al. | |

(Continued)

FOREIGN PATENT DOCUMENTS

| | | |
|---|---|---|
| EP | 0 716 513 A1 | 12/1996 |
| JP | 2005269026 | 9/2005 |

OTHER PUBLICATIONS

PCT/US2009/044759 International Search Report with Written Opinion of the International Searching Authority mailed Jan. 5, 2010.

(Continued)

*Primary Examiner* — Freshteh N Aghdam
(74) *Attorney, Agent, or Firm* — Trop, Pruner & Hu, P.C.

(57) ABSTRACT

In one embodiment, a method for performing antenna diversity combining for digitally broadcast radio signals includes generating a first signal quality metric for a first signal obtained from an incoming digitally broadcast radio signal received in a first signal path, and similarly generating a second signal quality metric for a second signal obtained from the radio signal received in a second signal path. Then the first and second signals from these paths can be coherently combined based on the signal quality metrics to obtain a combined frequency domain symbol. In some embodiments, this combined frequency domain symbol may be remodulated to a time domain symbol. Also in some embodiments N tuners can be daisy chained to generate a final output that is either a frequency domain symbol of combined sub-carriers, soft bits to a forward error correction (FEC) decoder, or a remodulated time domain symbol. As a further possibility, each of the N tuners can use a different local oscillator (LO) frequency.

15 Claims, 8 Drawing Sheets

(56) References Cited

U.S. PATENT DOCUMENTS

| | | |
|---|---|---|
| 2006/0031276 A1 | 2/2006 | Kumamoto et al. |
| 2007/0036249 A1 | 2/2007 | Shatara et al. |
| 2008/0025446 A1 | 1/2008 | Van Wechel et al. |
| 2008/0031369 A1* | 2/2008 | Li et al. .................. 375/260 |
| 2008/0291857 A1 | 11/2008 | Arad et al. |
| 2008/0298515 A1 | 12/2008 | Peyla et al. |
| 2009/0103644 A1 | 4/2009 | Nakao |
| 2009/0298453 A1 | 12/2009 | Elenes et al. |
| 2010/0135377 A1 | 6/2010 | Li et al. |
| 2010/0159837 A1* | 6/2010 | Dent et al. ................ 455/63.1 |
| 2010/0165926 A1* | 7/2010 | Fukuoka et al. .......... 370/329 |
| 2011/0038446 A1* | 2/2011 | Keller ........................ 375/346 |
| 2011/0039492 A1 | 2/2011 | Johnson et al. |
| 2011/0243209 A1* | 10/2011 | Oren et al. ................. 375/227 |
| 2011/0310948 A1* | 12/2011 | Ramesh et al. ............ 375/229 |
| 2012/0028567 A1 | 2/2012 | Marko |
| 2012/0321012 A1 | 12/2012 | Elenes et al. |
| 2014/0094130 A1 | 4/2014 | Elenes et al. |

OTHER PUBLICATIONS

U.S. Appl. No. 12/894,316, filed Sep. 30, 2010 entitled, "Detecting Digital Radio Signals," by Javier Elenes, et al.

* cited by examiner

PROVIDING PHASE DIVERSITY COMBINING OF DIGITAL RADIO BROADCAST SIGNALS

BACKGROUND

Multipath distortion is caused when two or more radio signals modulating the same message signal arrive at a receiver at different times and with different phases and attenuation levels due to reflections of the signal from various objects. The radio signal, prior to arriving at the receiver, can experience changes in amplitude and phase due to two types of multipath fading: flat and frequency-selective. In urban environments, reflections from close-in objects such as buildings result in short delay multi-path fading, causing wideband deep fades. In this scenario all spectral components of the signal experience amplitude attenuation simultaneously (flat fading). In turn, long multipath delay (or frequency selective fading) arises due to reflections from objects several kilometers away such as distant hills and tall buildings. In this case subsets of sub-carriers in the signal are impaired. Multipath impairments on a digital radio signal result in increased bit error rates at the demodulator output and may result in audio distortion and or partial loss of data services.

Antenna diversity is a scheme whereby two or more antennae are used to receive a common signal and the signal is combined to compensate for fading impairments. The fundamental assumption of receiving the same signal on spatially separated antennae and combining the signals is that of uncorrelated fading. That is, while the signal received on one antenna may be faded, little to no fading will occur on the signal received on the other antenna. Moreover, a diversity receiver can produce a signal with higher signal-to-noise ratio (SNR) (up to 3 dB) when no fading is present, resulting in greater audio quality and data services integrity as compared to a single antenna system. Although antenna phase diversity for analog FM broadcast signals is known and implemented in certain vehicle platforms, current architectures cannot handle digital radio broadcasts (for example HD™ radio or Digital Audio Broadcasting (DAB)).

SUMMARY OF THE INVENTION

According to one aspect, the present invention includes a method for performing antenna diversity combining for digitally broadcast radio signals. The method includes generating a first signal quality metric for a first signal obtained from an incoming digital RF signal received in a first signal path, and similarly generating a second signal quality metric for a second signal obtained from the incoming digital RF signal received in a second signal path. Then the first and second signals from these paths can be coherently combined based on the signal quality metrics to obtain a combined frequency domain symbol. More specifically, the combining can be such that the signal having a higher signal quality metric has a greater weight in the combined signal.

In different implementations, this combined symbol can be further processed, e.g., in a single chip that includes the signal paths, or it can be remodulated to be sent to a different chip for further processing. As one example, the combined can be provided to a digital demodulator and a forward error correction (FEC) decoder on a common semiconductor die with the first and second signal paths for processing. Alternately, the symbol can be remodulated to a time domain orthogonal frequency division multiplexing (OFDM) symbol, and transmitted to an OFDM demodulator.

In some implementations, to further improve signal quality, especially in the presence of a close-in blocker signal, the two paths may operate at different frequencies (e.g., by using different mixing signals, such as one mixing signal having a frequency greater than a desired channel frequency and a second mixing signal having a frequency less than the desired channel frequency).

Yet another aspect of the present invention is directed to an apparatus having a tuner. The tuner may include a first analog front end to receive a broadcast RF signal that is OFDM modulated and downconvert it to a second frequency signal. In turn, a first fast Fourier transform (FFT) engine can generate first sub-carriers from the second frequency signal. Then a first estimator can generate a first signal quality metric for each of the first sub-carriers. In turn, a first multiplier can generate a first product of each of the first sub-carriers and the corresponding first signal quality metric. Finally, this product may be combined with a second products obtained from a second tuner, which in some embodiments can be similarly configured.

In one embodiment, the first signal quality metric is a ratio of desired signal power to undesired signal and noise power phase shifted by a phase difference between the second tuner and the first tuner at each sub-carrier, and the second signal quality metric is a ratio of desired signal power to undesired signal power.

A still further aspect of the present invention is directed to a system having multiple tuners each to receive and downconvert a digital radio broadcast signal to an intermediate frequency (IF) signal, digitize the IF signal and generate a weighted digitized frequency domain symbol based on a signal quality metric of the IF signal. In turn, a combiner can combine these weighted frequency domain symbols into a combined frequency domain symbol, and a remodulator can remodulate the combined frequency domain symbol to a time domain symbol.

DETAILED DESCRIPTION

Embodiments may provide for a multi-tuner phase diversity scheme for reception of digital broadcast radio signals, such as transmitted according to an orthogonal frequency division multiplexing (OFDM) scheme. After receipt in the given tuner from an associated antenna, the radio frequency (RF) signal may be downconverted. In turn, a digitized signal from each tuner is coherently combined in the frequency domain to obtain a combined digital signal that may then be provided to a digital demodulator and forward error correction (FEC) decoder. The signals from the multiple antennas may be combined in a predetermined manner based on relative quality metrics associated with each signal to produce a combined signal that is more robust to multipath fading.

Implementations may vary. However, certain implementations may be used for automotive radios. In such an automotive system, multiple antennas may be provided, with the output of each antenna provided to a separate and independent signal path. In certain implementations, such signal paths may be present in different integrated circuits (ICs) although in other implementations multiple signal paths may be formed in a single IC, either on separate die of the IC or on a single IC die. Based on one or more quality metrics associated with the signals, embodiments may combine the signal information from the multiple paths in a predetermined manner to provide a signal output that can be coupled to digital demodulator circuitry, which may be present in one of the ICs (in a multiple IC implementation) or part of the single IC (in a single IC implementation). In yet other implementations, the demodulator may be part of a different integrated circuit.

Thus in various embodiments of an antenna diversity system, two or more antennae that are physically spaced apart are each configured to receive a RF signal, which can be provided to a corresponding tuner circuit. In some embodiments, the tuner circuits can be interconnected by inter-chip communication links and have inter-chip communications circuitry configured to communicate content from received radio signals using an inter-chip data bus. In a daisy-chain configuration with additional tuner circuits, the next tuner circuit can be connected to the data circuit through another inter-chip communication link.

In various implementations, the tuner architecture may be according to a low-intermediate frequency (IF) or zero-IF design, in which various signal processing can be performed to combine the multiple tuner outputs. In one embodiment, this processing can include: carrier and timing recovery performed independently on each tuner's signal; appropriate complex weights are derived for each sub-carrier; individual sub-carriers are weighted using the complex weights and the resulting digitized signal is subsequently output to a digital demodulator and FEC decoder for source audio and data recovery.

In some embodiments, multiple tuners can be used also to improve image rejection of the system. In such embodiments, each tuner local oscillator (LO) is tuned to a different offset frequency relative to the desired signal carrier frequency. This results in different IF frequencies and/or LO injection sides. One possible embodiment is for the case of 2 tuners, where a first tuner is tuned to the carrier frequency plus the IF frequency (high side LO injection) and a second tuner is tuned to the carrier frequency minus the IF frequency (low side LO injection). Low IF tuners are susceptible to large blockers with an offset of twice the IF frequency. This is so, as the image of the blocker lands on top of the desired signal. Using different LO injection sides in an antenna diversity configuration can alleviate this problem since the blocker will impair the received signal from one tuner but not from the other. The digitized signals from each tuner can be frequency de-rotated to baseband before applying coherent combining. By using a signal quality metric from each sub-carrier (for example, ratio of desired signal power to undesired signal and noise power) to derive its contribution to the combined signal, sub-carriers impaired by a strong image (and thus having a low ratio) will not substantially contribute to the combined signal. Thus this technique assigns higher weights to the unimpaired sub-carriers from the tuner not affected by the image and therefore allows for improved system selectivity relative to a single antenna low-IF system where a large image can impair the wanted signal.

Figure 1:
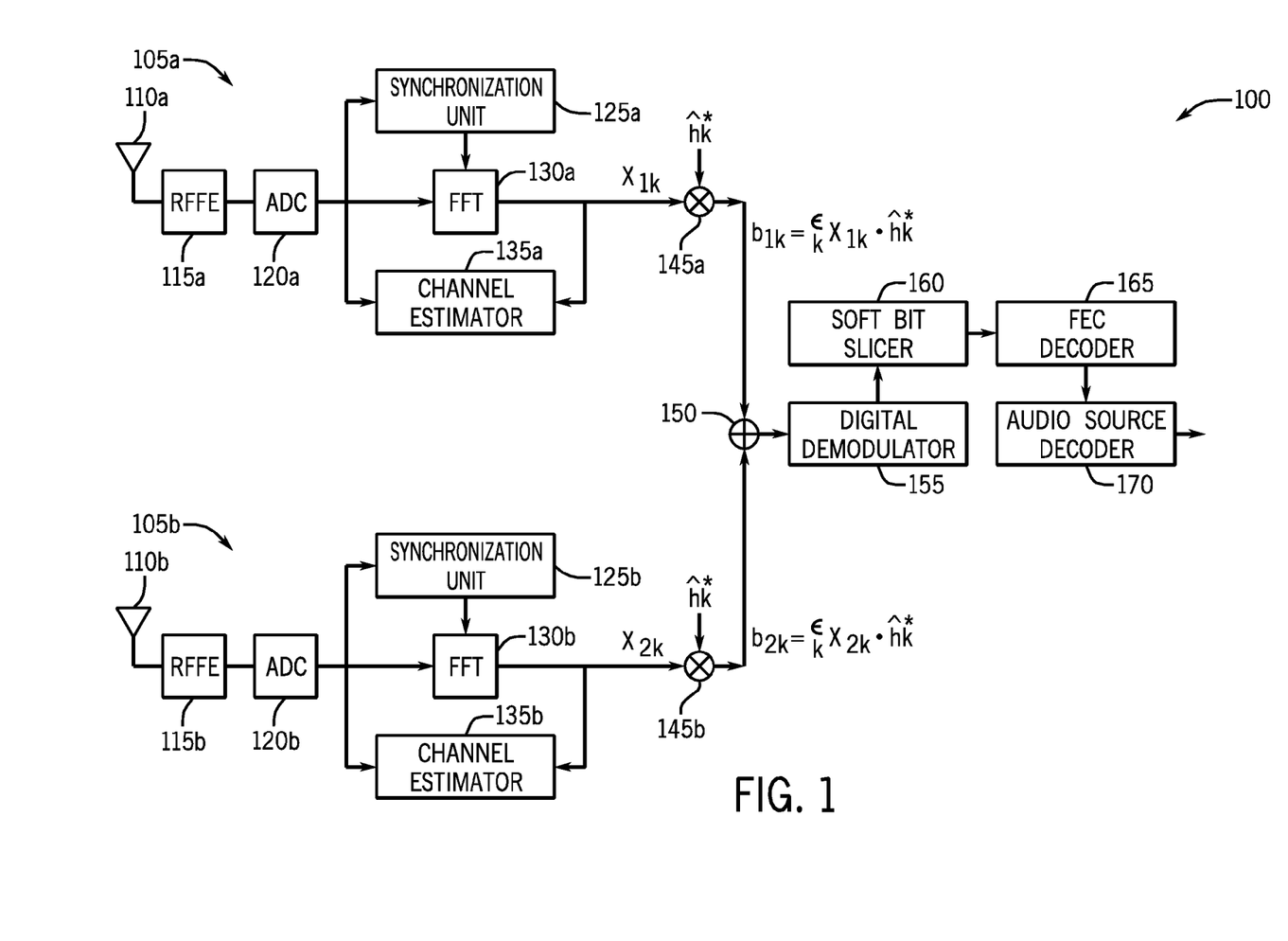
FIG. 1 is a block diagram of a diversity receiver in accordance with an embodiment of the present invention.

Referring now to FIG. 1, shown is a block diagram of a diversity receiver in accordance with an embodiment of the present invention. As shown in FIG. 1, receiver 100 may include multiple parallel paths, namely a first path $105_a$ and a second path $105_b$. Each path 105 includes various components. For ease of discussion, the components of first path 105 (all enumerated with a reference numeral having an "a" subscript) are discussed, although understand that similar components are present in parallel path $105_b$. As will be discussed further below, embodiments can be incorporated in different types of receiver systems. In some embodiments, receiver 100 may be a single-die integrated circuit such as a CMOS die having mixed signal circuitry including both analog and digital circuitry. In other implementations, each parallel path may be implemented on a separate receiver chip, with each path present on different dies of a single IC package (or within separate IC packages). And as will be discussed further below, certain circuitry may additionally be present in another chip such as a digital demodulator and FEC decoder With reference to receiver 100, an incoming radio RF signal which may include digital radio signals according to a given digital broadcast specification may be received over the air via an antenna $110_a$. As used herein, the terms "digital radio" or "digital radio broadcast signal" are used interchangeably and are intended to correspond to broadcast radio communication that occurs digitally, e.g., as one or more sideband channels to a main analog signal channel. Such communications may be in accordance with various standards such as a National Radio System Committee (NRSC-5C, also known as HD™ radio), Digital Audio Broadcasting (DAB), Digital Radio Mondiale (DRM) or other standard. The RF signal may be provided to a RF front end (RFFE) circuit $115_a$. Generally, RFFE $115_a$ may include various analog circuitry to receive, process, and downconvert the RF signal to a lower frequency signal, e.g., a low-IF or zero-IF signal. In general, RFFE circuit $115_a$ may include gain control elements, downconversion circuitry, filters and so forth.

The resulting downconverted signal may be provided to an analog-to-digital converter (ADC) $120_a$, where the signal can be digitized into a digital signal. As seen, the digitized signal may be provided to multiple circuit blocks that perform various processing on the incoming digital signals. Specifically, the signals can be provided to a fast Fourier transform (FFT) engine $130_a$, which generates frequency domain OFDM symbols from the incoming time domain OFDM symbols. In one embodiment, each incoming time domain OFDM symbol can be processed by FFT engine $130_a$ into a plurality of sub-carriers, e.g., 1024 sub-carriers, although the scope of the present invention is not limited in this regard.

In addition, the incoming time domain OFDM symbol from ADC $120_a$ may be provided to a synchronization unit $125_a$, which may be used to synchronize the receiver with the transmitter, e.g., based on pilot or other synchronization information transmitted throughout a given transmission. While not shown for ease of illustration in FIG. 1, based on the synchronization information generated by synchronization unit $125_a$, control of various front end elements can be performed. For example, a sampling rate can be provided for ADC $120_a$ and timing control for downconversion circuitry can also be provided. In addition, timing control can be provided to FFT engine $130_a$.

The OFDM symbol may further be provided to a signal quality estimator $135_a$, which generates a signal quality metric of each of the individual sub-carriers. More specifically, estimator 135a may generate a channel estimate ($\hat{h}_k$) which is a complex number for each sub-carrier. The magnitude of this estimate is a first order approximation to SNR if the noise is flat across the frequency band of the desired signal. In the case of a strong co-channel interferer such as an image, the magnitude of the channel estimate is misleading as an image would produce a large channel estimate magnitude. In this case, a true ratio of desired signal power to undesired signal and noise power may be used. Thus in one embodiment the signal quality metric is the complex conjugate of the channel estimate on a per sub-carrier basis. In another embodiment the signal quality metric is the ratio of desired signal power to undesired signal and noise power on a sub-carrier basis, multiplied by the phase response of the channel estimate on a sub-carrier basis.

As seen, the sub-carrier outputs ($X_{1k}$ and $X_{2k}$) are weighted according to the complex conjugate of the signal quality metric via a combiner $145_a$ which in various embodiments may be implemented as a complex multiplier. Multiplying the sub-carriers by a complex number has the effect of scaling their magnitude and applying a phase shift. The complex scaling factors are chosen such that sub-carriers from different antennas are phase aligned and properly weighted prior to combining in adder 150. That is, the complex conjugate achieves phase alignment: since the phase of the signal quality metric is that of the channel, multiplying by the complex conjugate will align to zero phase. In turn, the products from each signal path may be combined in an adder 150 to generate a combined frequency-domain OFDM symbol. Thus as seen in FIG. 1, the products of each path, $b_{1k} = \Sigma_1{}^k x_{1k} \times \hat{h}_k^*$ and $b_{2k} = \Sigma_2{}^k x_{2k} \times \hat{h}_k^*$, are combined in adder 150 to obtain a combined frequency domain symbol of $b_{1k} + b_{2k}$. The combined frequency domain symbol is in turn provided to a digital demodulator 155, which produces a soft bit per demodulated (combined) sub-carrier.

Note that because receiver 100 is configured as a diversity receiver, it is likely that when an impairment exists in one of the paths, the other path does not have the same impairment since its phase differs. Accordingly, by performing the multiplication at combiner 145, a noise-affected signal will have a lower value output from combiners 145, and thus will contribute less to a combined sub-carrier value obtained at summer 150. Additionally the products at the outputs of combiners 145 are phase aligned. Understand also that although shown for ease of illustration in FIG. 1 as including two parallel paths, the scope of the present invention is not limited in this regard and in other embodiments more than two such paths can be present.

The output from demodulator 155 is provided to a soft decision slicer 160 that applies scaling and quantization suitable for soft decision FEC decoding. In a most general case, e.g., for the single-chip receiver shown in FIG. 1, the soft bits may be provided to an FEC decoder 165 which includes various components to further decode the soft bits into an audio output. As an example, in a DQPSK system such as DAB, demodulated QPSK symbols are scaled and quantized into soft bits which are provided to a deinterleaver, Viterbi decoder and Reed-Solomon decoder to generate an encoded audio signal. The encoded audio signal is then provided to an audio source decoder 170 to generate source audio. Although shown as individual components, understand that portions of the receiver after ADC 120 to the end of the signal processing path of FIG. 1 can be implemented in a digital signal processor (DSP). Note that while described with this particular embodiment in FIG. 1, the scope of the present invention is not limited in this regard, and other implementations are possible, and additional circuitry can be present. For example, the RF front end may further be coupled to other back end circuitry to handle demodulation of analog radio bands such as AM or FM bands.

Further, in other embodiments, particularly where a third-party single-antenna OFDM demodulator is used, remodulation circuitry can be present after diversity combining to obtain a time domain remodulated signal so that OFDM demodulation can be performed on the combined time domain signal.

Figure 2:
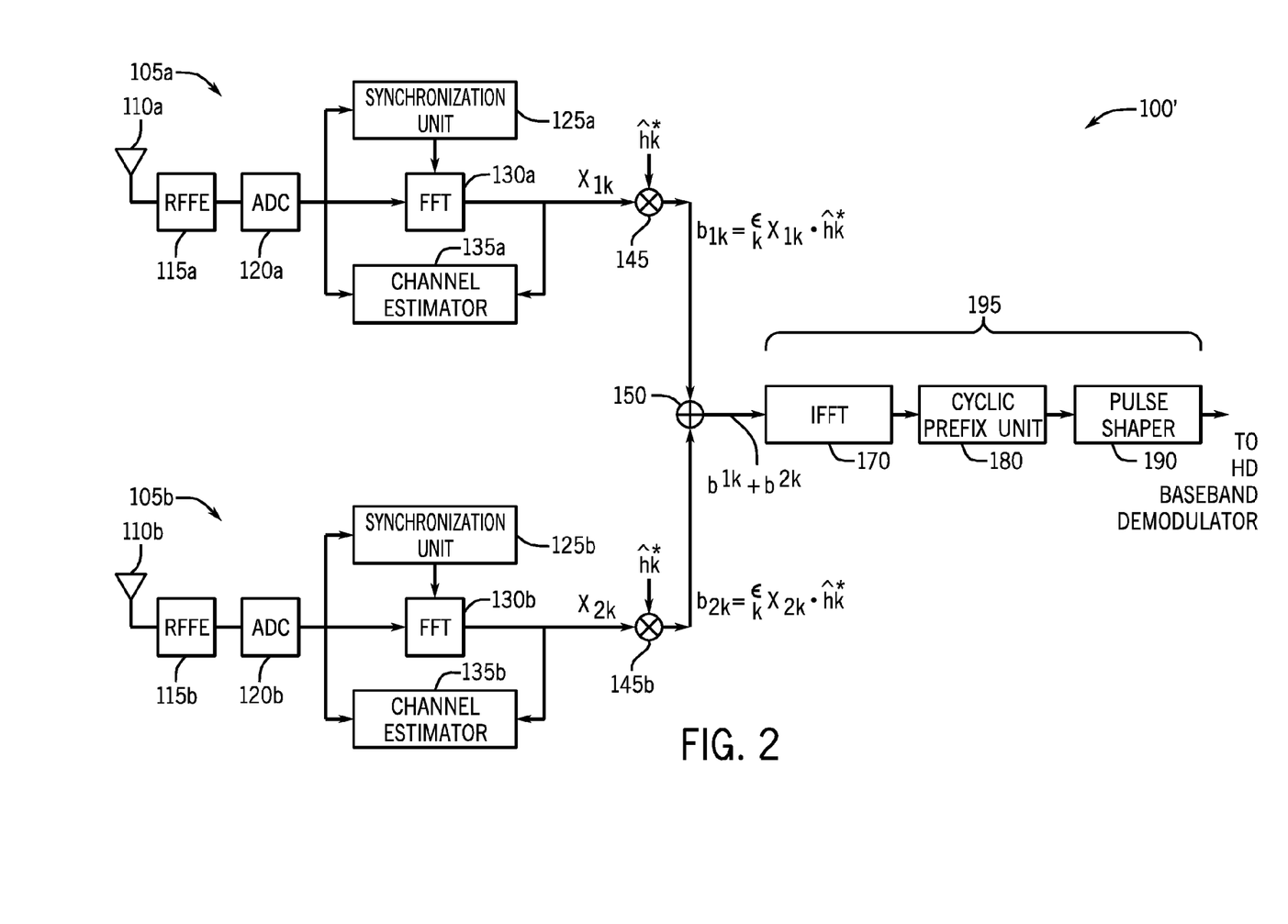
FIG. 2 is a block diagram of a diversity receiver in accordance with another embodiment of the present invention.

Referring now to FIG. 2, shown is a block diagram of a diversity receiver 100' in accordance with another embodiment of the present invention. As shown in FIG. 2, receiver 100' may generally track that of receiver 100 of FIG. 1 through the combination performed in adder 150. In this case the combined frequency-domain OFDM signal can be provided to a remodulator that converts it into a time domain OFDM signal.

Specifically in the embodiment of FIG. 2, remodulation circuitry 195 may be implemented in various components that provide for conversion back to time domain signals so that they can be sent to a separate baseband demodulator that performs OFDM demodulation and FEC decoding on the combined time domain OFDM signal. As seen in FIG. 2, the frequency-domain combined signal may be provided to an inverse fast Fourier transform engine 170, where the frequency domain sub-carriers can be converted back to time domain signals. Then additional possible processing circuits can be present to perform various signal conditioning functions that are typically done in an OFDM transmitter. For example, a cyclic prefix is added to the time domain signal where the last N samples are prepended to the signal, in a cyclic prefix unit 180. In addition, a pulse shaper 190 may be present to provide pulse shaping to the signal. The resulting time domain OFDM signal may thus be provided to a separate baseband demodulator (not shown for ease of illustration in the embodiment of FIG. 2), which generally performs synchronization, FFT, QPSK demodulation, FEC decoding, and source audio decoding to obtain an audio and data outputs.

Thus FIGS. 1 and 2 show separate tuners for multiple paths, diversity combining of frequency domain sub-carriers, demodulation and FEC decoding (in the embodiment of FIG. 1) or remodulation to time domain OFDM symbols for output to a separate baseband demodulator. While the receivers shown in FIGS. 1 and 2 can be implemented on a single semiconductor die, the scope of the present invention is not limited in this regard and different implementations are possible.

Figure 3A:
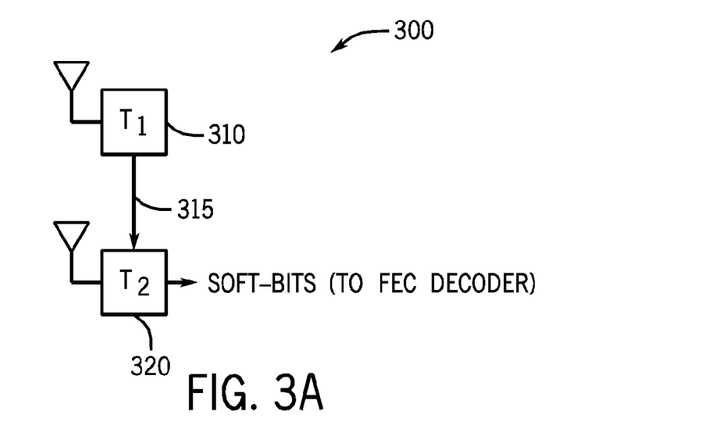
FIGS. 3A-3C are representative implementations of digital broadcast radio diversity combining techniques in accordance with an embodiment of the present invention.
Figure 3B:
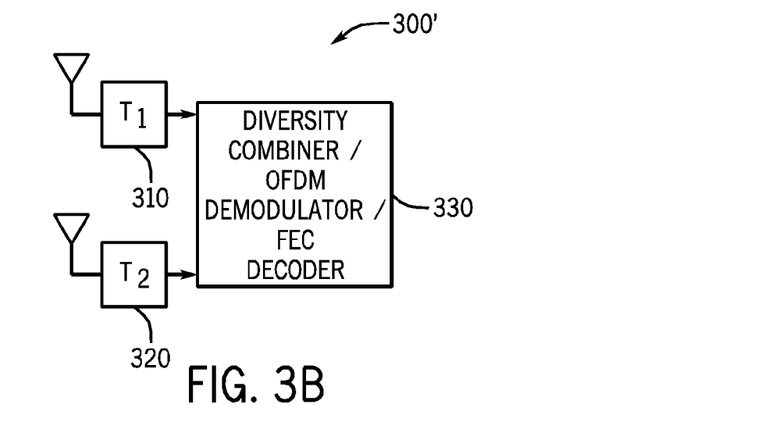
Figure 3C:
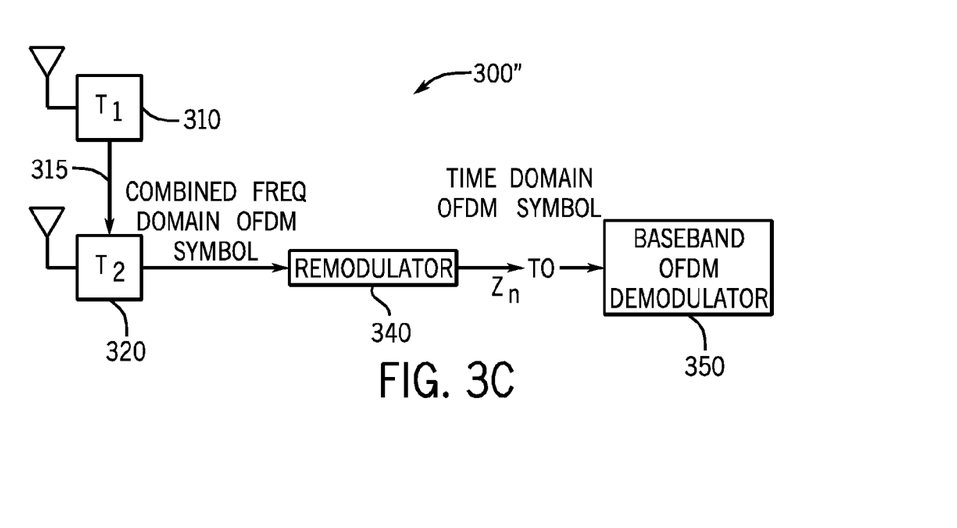

Representative implementations of digital radio diversity combining can be seen in FIGS. 3A-3C. Specifically, FIG. 3A shows an embodiment of a receiver 300 with multiple tuners, where the frequency domain sub-carriers weighted according to the corresponding signal quality metrics (as discussed above in FIG. 1) from a first tuner 310 can be provided to a second tuner 320. In different embodiments, the tuners can be implemented on separate semiconductor die or be part of a single die or multiple die within an IC package. As seen in FIG. 3, the weighted sub-carriers can be communicated to second tuner 320 via a link 315 which can be an inter or intra-chip link depending on the embodiment. Then these weighted sub-carriers can be combined in second tuner 320 with the corresponding weighted sub-carriers generated in second tuner 320. In various embodiments, the combining may be performed in a DSP of second tuner 320. Then the soft bits for each combined sub-carrier may be output, e.g., directly to a demodulator and FEC decoder to perform the back-end processing shown in FIG. 1. In other implementations, the combined sub-carriers may be sent to a third receiver (in this case, combined sub-carriers are sent, not soft bits) and so forth (e.g., N receivers can be set up in a daisy chain configuration). In this way, the last receiver may output the overall combined sub-carriers (or it may demodulate the combined sub-carriers and produce soft bits). The combined sub-carriers are then demodulated and FEC decoded (as mentioned earlier, this can happen in the last combiner unit or in the back end decoder).

In yet another implementation, as shown in FIG. 3B, downconverted and digitized signals from first and second tuners 310 and 320 of a receiver 300' may instead be provided to a combined diversity combiner/OFDM demodulator/FEC decoder 330 which can be implemented on its own chip. In this separate chip 330, time domain samples from each tuner can be provided so that the separate chip 330 performs synchronization and FFT processing, weighting, combining and symbol decoding, as discussed above.

Next regarding the implementation shown in FIG. 3C, receiver 300" may be adapted similarly to that of FIG. 3A, with weighted sub-carriers from first tuner 310 being provided to second tuner 320 for combining via link 315. However, the combined sub-carriers from second tuner 320 corresponding to a combined frequency domain OFDM symbol may be provided to a remodulator 340, which may be of a common chip or a separate chip. In the remodulator, the resulting combined sub-carriers can be remodulated to a time domain OFDM symbol for providing to a separate baseband demodulator 350. While shown with these particular examples in the embodiments of FIGS. 3A-3C, understand the scope of the present invention is not limited in this regard and still further implementations are possible.

Figure 4:
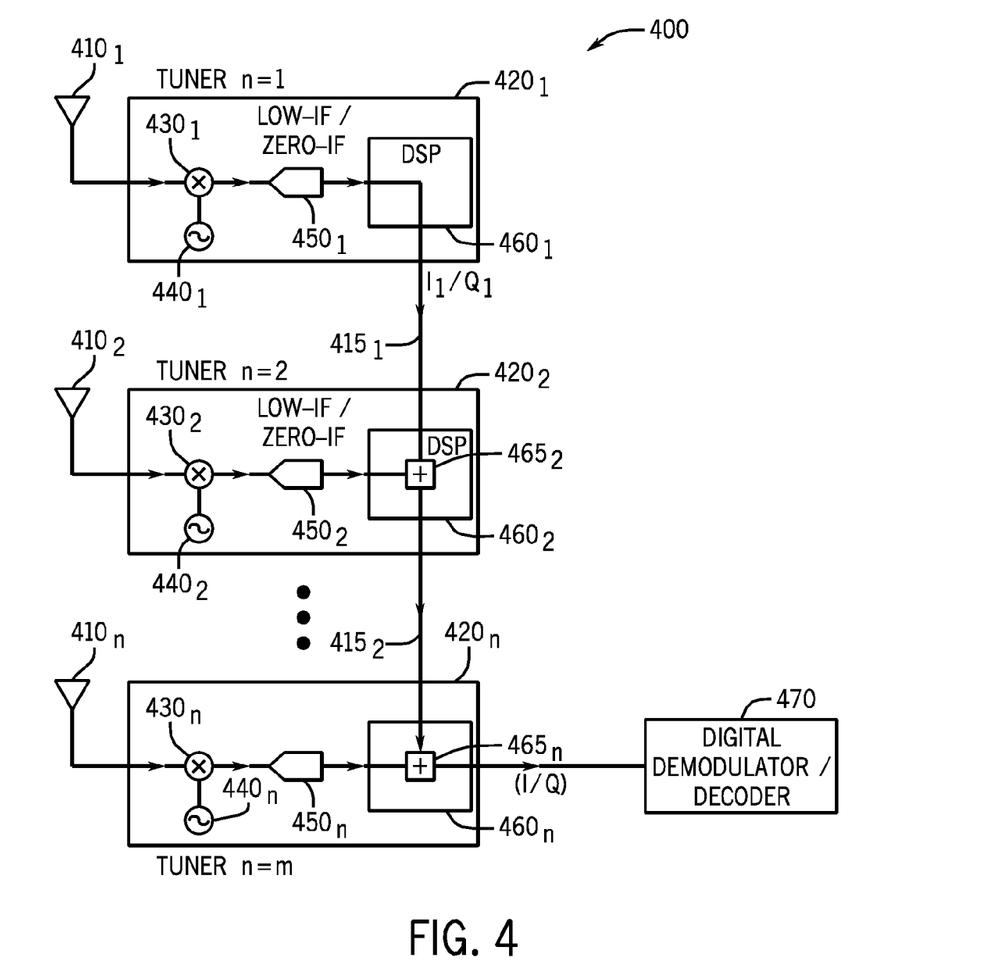
FIG. 4 is an illustration of another embodiment of the present invention.

Referring now to FIG. 4, shown is an illustration of another embodiment of the present invention. Specifically, FIG. 4 shows a multi-tuner receiver 400 that includes a plurality of individual tuners $420_1$-$420_n$, each of which is associated with a separate antenna $410_1$-$410_n$. In one embodiment, each tuner can be configured on a separate semiconductor die, either all of which are in a single IC package or which themselves can be in separate packages.

FIG. 4 is shown at a high level, with an incoming RF signal from each antenna being downconverted in a corresponding mixer $430_1$-$430_n$, each of which receives the incoming RF signal and a LO frequency from a corresponding controlled oscillator $440_1$-$440_n$. The downconverted signals may then be converted to digital complex signals in corresponding ADCs $450_1$-$450_n$. Note that although the front end of these receivers is shown at this high level, understand that additional components including LNAs, other programmable gain elements, filters and so forth may be present.

The resulting time domain OFDM signal is provided to a corresponding DSP $460_1$-$460_n$, where an FFT is taken to generate frequency domain sub-carriers and a weighting process can be performed to obtain weighted sub-carriers. As seen in the embodiment of FIG. 4, the weighted sub-carriers generated in first tuner $420_1$ may be provided via a first link $415_1$ to the DSP of second tuner $420_2$ where these weighted sub-carriers can be combined with corresponding weighted sub-carriers in the second tuner, more specifically within a phase diversity combiner $465_2$ of second tuner $420_2$. In turn, these combined weighted sub-carriers can be provided to third tuner $420_3$ via a second link $415_2$ for a further combining with weighted sub-carriers generated in that tuner in an additional phase diversity combiner $465_3$, generating a total combined set of sub-carriers corresponding to a combined frequency domain OFDM symbol, which can in turn be provided to a digital demodulator and FEC decoder 470. Of course as in other embodiments discussed, the total combined symbol can be remodulated to a time domain OFDM symbol before being provided to a separate baseband OFDM demodulator.

Figure 5:
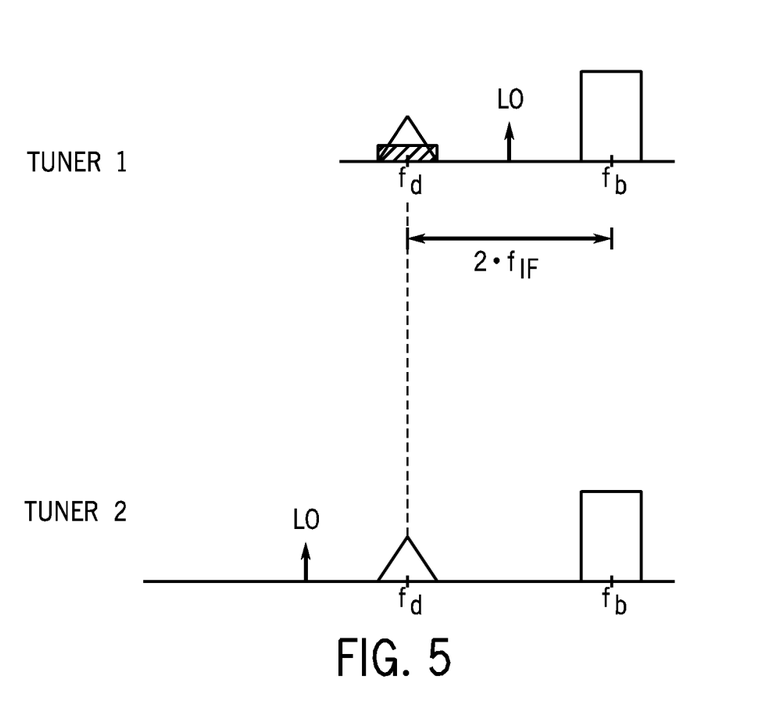
FIG. 5 is an illustration of a blocking channel mitigation technique in accordance with one embodiment of the present invention.

In addition to providing diversity combining, some implementations may further provide for enabling improved reception in the presence of a blocker that interferes with a desired signal. Referring now to FIG. 5, shown is an illustration of a blocking channel mitigation technique in accordance with one embodiment of the present invention. Specifically, as seen in FIG. 5, a first tuner may have its LO frequency set at a frequency higher than a desired channel, namely by an amount of the IF frequency at which the receiver is configured to operate. Thus as seen, the LO frequency is at an offset of $f_{IF}$ from a desired channel $f_D$. As seen, a relatively large blocker or undesired signal is present at a channel frequency that is at an offset of 2 $f_{IF}$ from the desired channel. As a result, an image of this blocking channel due to the LO frequency selection thus interferes with the desired channel.

Embodiments may resolve this issue by providing multiple tuners in a diversity combining scheme with at least some of the multiple tuners operating at different LO frequencies. Thus as seen in FIG. 5 a second desired channel frequency is the same, and the blocking signal is at the same location. However, the second tuner is configured to operate with a LO that is at a lower frequency than the desired channel, namely at an offset of $f_{IF}$ to the low side of the desired channel. As a result, the image of the blocking channel does not interfere with the desired channel. Accordingly, by configuring receivers for operation at high side and low side injection, a blocking signal present at one side of a desired channel will not affect both receivers. Thus by performing a sub-carrier weighting and combining operation as discussed above, the image-impaired signal from the first tuner can be weighted at small value relative to the weighting of the unimpaired signal from the second tuner to thus provide for improved receiver performance. Note, for this to work, a signal quality metric on a per sub-carrier basis may be used that reflects the ratio of desired signal power to undesired signal and noise power (e.g., Pdesired/(Pundesired+Pnoise)). And in such implementations, the ratio for the first signal path can be weighted (e.g., multiplied) by the complex conjugate of the channel estimate phase response.

Figure 6:
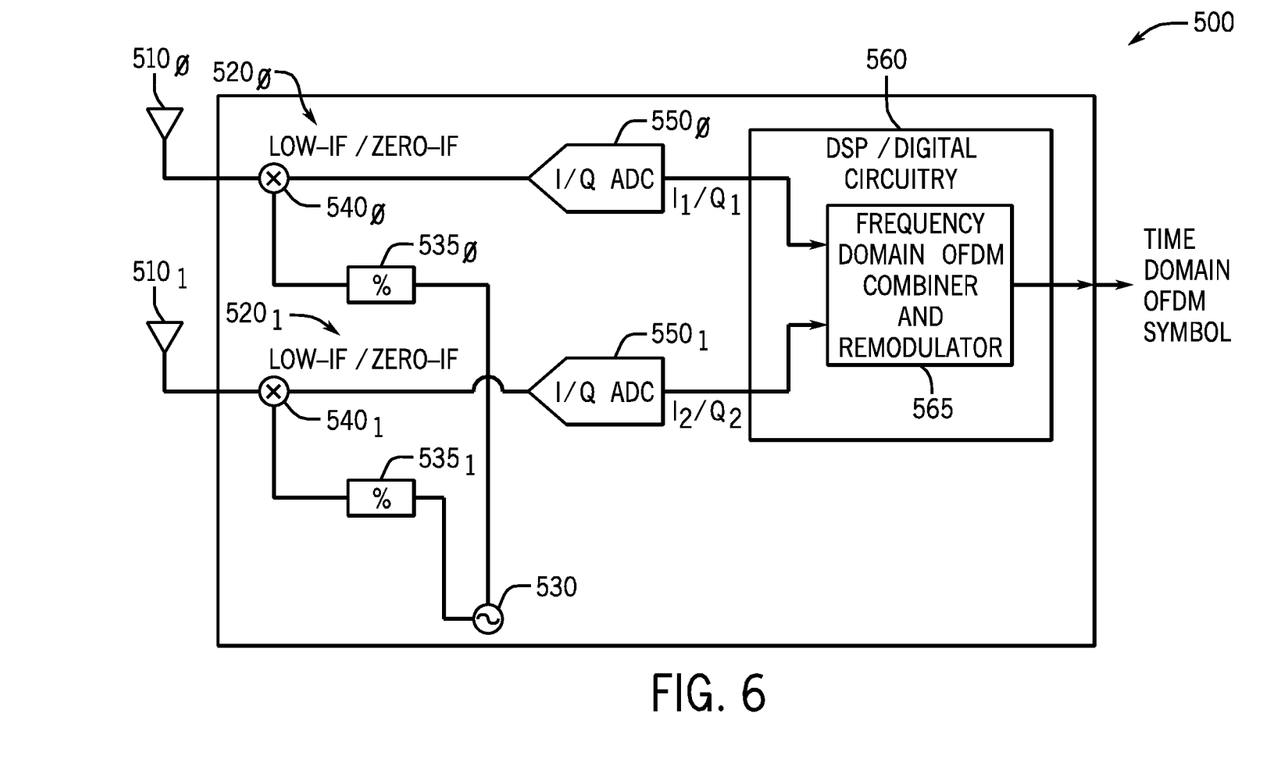
FIG. 6 is a block diagram of a receiver in accordance with yet another embodiment of the present invention.

Referring now to FIG. 6, shown is a block diagram of a receiver in accordance with yet another embodiment of the present invention. As shown in FIG. 6, receiver 500 may include multiple independent tuner paths, namely a first tuner path $520_0$ and a second tuner path $520_1$. As seen, each tuner path is coupled to receive an incoming RF signal from a corresponding antenna 510. Note that configured between a controlled oscillator 530 (which in one embodiment may be a voltage controlled oscillator) and corresponding mixers $540_0$ and $540_n$ may be corresponding frequency dividers $535_0$-$535_1$. These frequency dividers may be set at different values to thus enable one of the receivers to operate with high-side injection and one to operate with low-side injection, thus resolving the blocking image problem shown in the example of FIG. 5. Note that in this embodiment, the mixer LO inputs for both tuners can be derived from the same oscillator/reference, namely a single controlled oscillator 530. In addition, both ADCs 550 may be provided sampling clocks derived from the same oscillator/reference.

As further seen in FIG. 6, additional signal processing as discussed above can be performed on the downconverted signals. Namely, the IF signals can be digitized in corresponding ADC $550_0$ and $550_1$, and the resulting digitized signals can be phase diversity combined in a combiner/remodulator 565 of a DSP 560. The combined frequency domain OFDM symbols can be remodulated into time domain OFDM symbols and provided to an external OFDM demodulator/FEC decoder. As another example, the combined frequency domain OFDM symbols may be demodulated, scaled and quantized into soft bits on chip to be provided to an external FEC decoder. Although shown with this particular implementation in the embodiment of FIG. 6, understand the scope of the present invention is not limited in this regard.

Figure 7:
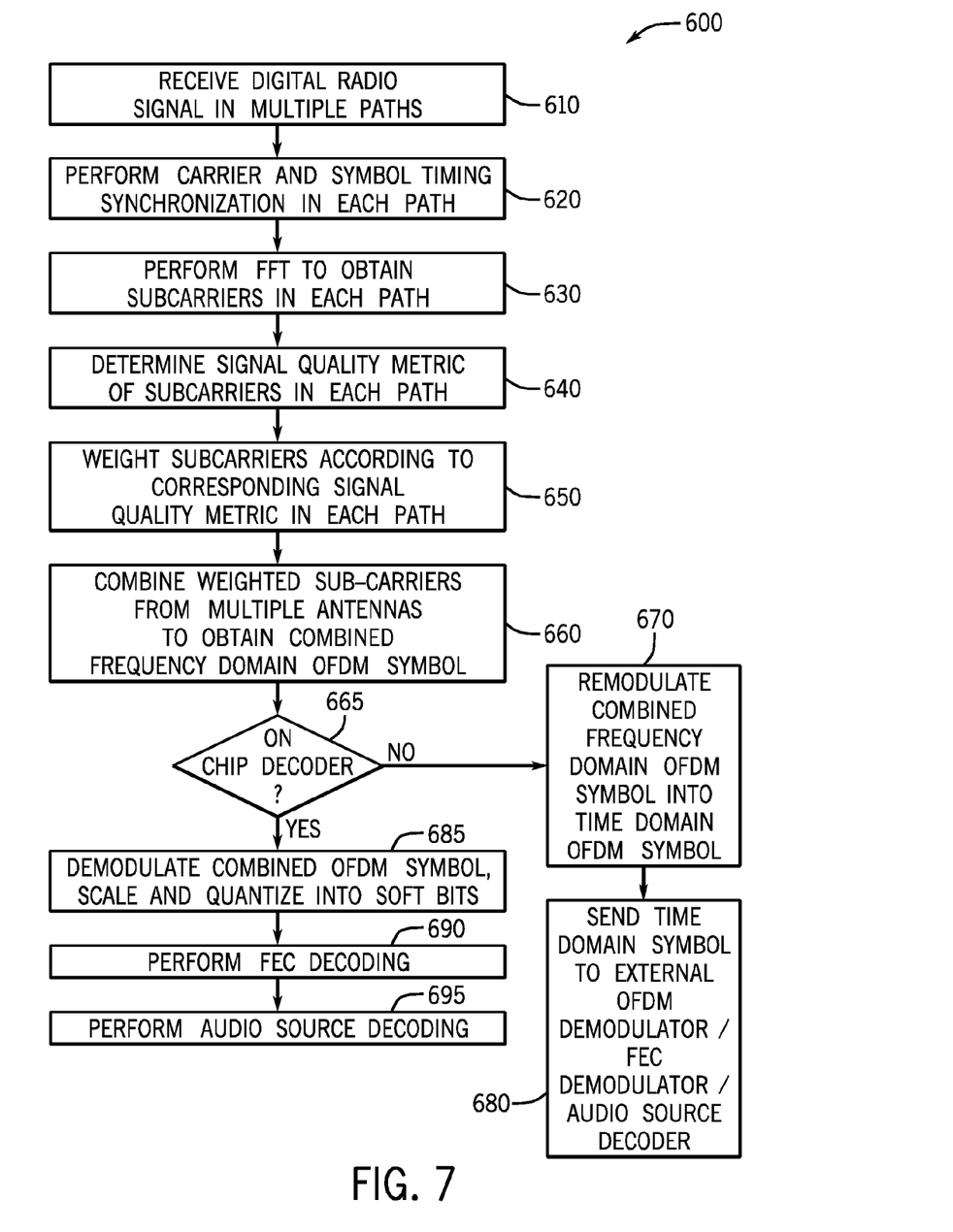
FIG. 7 is a flow diagram of a method in accordance with an embodiment of the present invention.

Referring now to FIG. 7, shown is a flow diagram of a method in accordance with an embodiment of the present invention. As shown in FIG. 7, method 600 may be implemented in a receiver, namely a multi-tuner receiver that can be implemented on one or more semiconductor die, and which may include a DSP or other programmable logic to perform at least portions of the method, e.g., via instructions stored in a non-transitory storage medium such as firmware of the receiver. Method 600 may begin by receiving a digital radio signal in multiple signal paths, each of a given tuner (block 610). In various embodiments, this signal may be a broadcast signal that is modulated according to a given digital modulation standard such as HD™ or DAB. Next, at block 620 carrier and symbol timing synchronization can be performed in the paths. Using the information obtained from such synchronization, a FFT can be performed in the paths to obtain a plurality of sub-carriers (block 630).

Next as seen in FIG. 7, a signal quality metric can be determined for each sub-carrier within the paths (block 640). Then the sub-carriers can be weighted according to their signal quality metric (block 650). Note that the complex weighting operation applies a phase shift to the sub-carriers, making them phase aligned (coherent) across different antennas. In block 660 the weighted sub-carriers from the antenna paths are combined to obtain a combined frequency domain OFDM symbol.

Still referring to FIG. 7, at diamond 665 it can be determined whether a given implementation of the receiver includes an on-chip FEC decoder. This determination can be based on, e.g., settings in a configuration register of the receiver. For example, this decoder may perform sub-carrier demodulation (producing soft-bits), deinterleaving, and FEC decoding on the combined frequency domain sub-carriers. In an implementation not having this back end decoding circuitry on-chip, control passes to block 670 where the combined frequency domain OFDM symbol can be re-modulated to a time domain OFDM symbol that can be sent to a separate OFDM demodulator such as a digital demodulator chip that can further perform FEC and audio source decoding (block 680).

Otherwise at diamond 665 if it is determined that the receiver itself includes decoding circuitry (e.g., on the same semiconductor die as at least one of the tuners), control can pass to block 685, where the combined OFDM symbol can be demodulated, scaled, and quantized into soft bits on which deinterleaving and FEC decoding (block 690) can be performed. And then audio source decoding can be performed (block 695).

Figure 8:
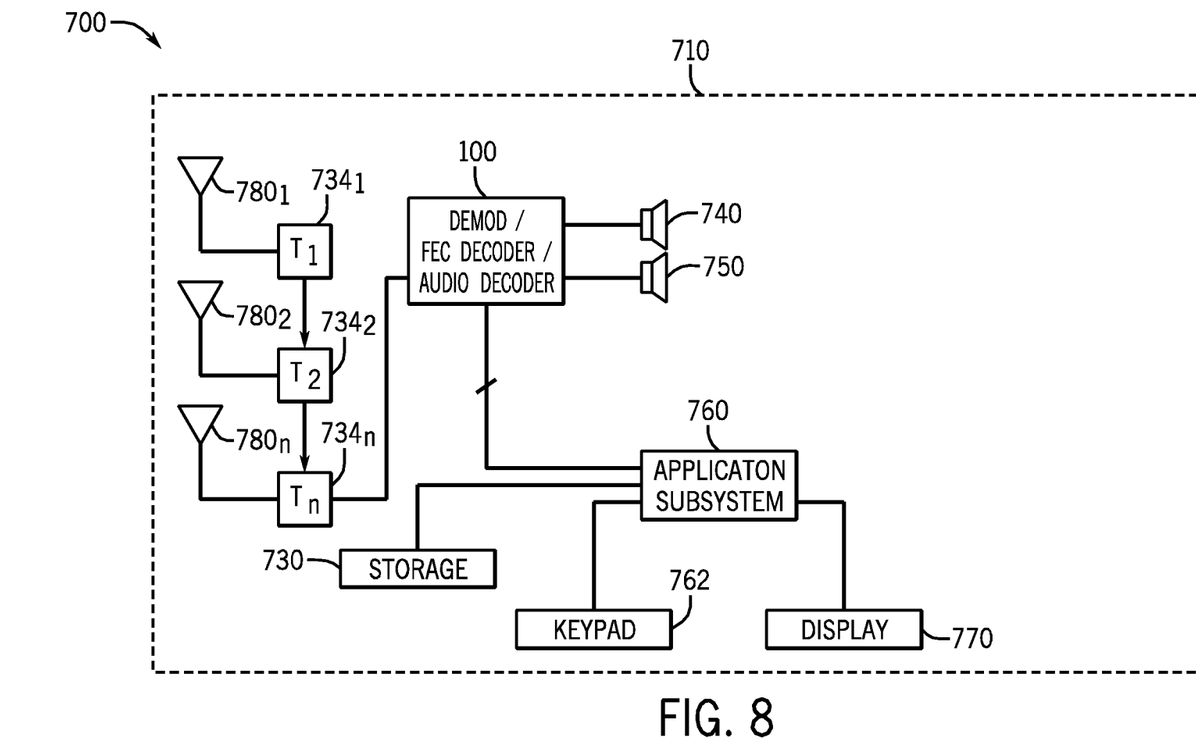
FIG. 8 is a block diagram of a system in accordance with an embodiment of the present invention.

Referring to FIG. 8, in accordance with some embodiments of the invention, an antenna diversity combining technique can be part of a multimedia portable wireless device 710, which in turn is part of a wireless system 700. As examples, the wireless device 710 may be a multi-function, multi-band radio, cellular telephone, smart phone, PDA, tablet computer, mobile game device, or so forth and may play music or book downloads, and may be part of a wireless link between a satellite antenna and a radio receiver, a terrestrial receiver, etc. In one of the embodiments, the wireless device may be a mobile radio receiver such as of a car stereo.

Among its other various functions, the wireless device 710 may store digital content on a storage 730, which may be a flash memory or hard disk drive, as a few examples. The wireless device 710 generally includes an application subsystem 760 that may, for example, receive input from a keypad 762 of the wireless device 710 (which may be a touch pad, e.g., of a display 770) and display information on display 770. Furthermore, the application subsystem 760 may generally control the retrieval and storage of content from the storage 730. As further seen in FIG. 8, multiple antennas $780_1$-$780_n$, each may be coupled to a corresponding tuner $734_1$-$734_n$, which can be coupled together such that the last tuner outputs a combined frequency domain symbol to a demodulator/FEC decoder/audio decoder 100, which may be directly connected to speakers 740 and 750 for output of audio data (understand that in some embodiments a separate audio processor may be integrated between the receiver and speakers).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
downconverting an incoming digital radio frequency (RF) signal received in a first signal path to a first signal using a first mixing signal having a frequency greater than a desired channel frequency;
downconverting the incoming digital RF signal received in a second signal path to a second signal using a second mixing signal having a frequency less than the desired channel frequency;
generating a first signal quality metric for the first signal;
generating a second signal quality metric for the second signal; and
coherently combining the first and the second signals from the first and the second signal paths based on the first and the second signal quality metrics to obtain a combined frequency domain symbol, wherein the first signal quality metric is a complex number corresponding to a ratio of desired signal power to undesired signal-and-noise power multiplied by a channel estimate phase response, and the first signal is weighted by the first signal quality metric and phase aligned to the second signal, and the second signal is weighted by the second signal quality metric.

2. The method of claim 1, further comprising coherently combining the first signal and the second signal such that the signal having a higher signal quality metric has a greater weight in the combined signal.

3. The method of claim 2, further comprising providing the combined frequency domain symbol to a digital demodulator and a forward error correction (FEC) decoder on a common semiconductor die with the first and the second signal paths.

4. The method of claim 2, further comprising providing the combined frequency domain symbol to a remodulator to remodulate the combined frequency domain symbol to a time domain orthogonal frequency division multiplexing (OFDM) symbol, and transmitting the time domain OFDM symbol to an OFDM demodulator.

5. The method of claim 1, further comprising generating the first and second the signal quality metrics and combining the first and the second signals in a digital signal processor of a radio receiver.

6. An apparatus comprising:
a first tuner including:
   a first analog front end to receive a broadcast radio frequency (RF) signal that is orthogonal frequency division multiplexing (OFDM) modulated and downconvert the broadcast RF signal to a second frequency signal, wherein the first analog front end is configured to downconvert the broadcast RF signal to the second frequency signal with a first mixing signal having a first frequency less than a desired channel frequency;
   a first fast Fourier transform (FFT) engine to generate a first plurality of sub-carriers from the second frequency signal;
   a first estimator to generate a first signal quality metric for each of the first plurality of sub-carriers;
   a first multiplier to generate a first product of each of the first plurality of sub-carriers and the corresponding first signal quality metric, wherein the first signal quality metric is a ratio of desired signal power to undesired signal and noise power multiplied by a first channel estimate phase response; and
a combiner to combine the first products and second products obtained from a second tuner, wherein the first products are phase aligned to the second products;
a remodulator to remodulate the combined first and second products to time domain to generate a time domain OFDM symbol; and
a digital demodulator to receive the time domain OFDM symbol and to perform front end demodulation on the time domain OFDM symbol to obtain a plurality of frequency domain sub-carriers and to perform demodulation and forward error correction (FEC) decoding on the plurality of frequency domain sub-carriers to generate an audio output and data services.

7. The apparatus of claim 6, further comprising a second tuner including:
   a second analog front end to receive the broadcast RF signal and downconvert the broadcast RF signal to a third frequency signal, wherein the second analog front end is configured to downconvert the broadcast RF signal to the third frequency signal with a second mixing signal having a second frequency, the second frequency greater than the desired channel frequency;
   a second FFT engine to generate a second plurality of sub-carriers from the third frequency signal;
   an estimator to generate a second signal quality metric for each of the second plurality of sub-carriers; and
   a second multiplier to generate the second product of each of the second plurality of sub-carriers and the corresponding second signal quality metric.

8. The apparatus of claim 7, wherein the second signal quality metric is a ratio of desired signal power to undesired signal power multiplied by a second channel estimate phase response.

9. The apparatus of claim 8, wherein the first and the second tuners are implemented on a single semiconductor die.

10. The apparatus of claim 6, wherein the first tuner comprises a digital signal processor (DSP) including the combiner, and wherein the DSP is to further perform the demodulation and the forward error correction (FEC) decoding.

11. The apparatus of claim 10, wherein the DSP is to further transmit the time domain OFDM symbol from a first semiconductor die including at least a second tuner to a second semiconductor die including the digital demodulator.

12. A system comprising:
   a first tuner to receive and downconvert a digital radio broadcast signal to a first intermediate frequency (IF) signal, digitize the first IF signal and generate a first weighted digitized frequency domain symbol based on a signal quality metric of the first IF signal, wherein the first tuner is configured to downconvert the digital radio broadcast signal to the first IF signal with a first mixing signal having a first frequency, the first frequency less than a desired channel frequency;
   a second tuner to receive and downconvert the digital radio broadcast signal to a second IF signal, digitize the second IF signal and generate a second weighted digitized frequency domain symbol based on a signal quality metric of the second IF signal, wherein the second tuner is configured to downconvert the digital radio broadcast signal to the second IF signal with a second mixing signal having a second frequency, the second frequency greater than the desired channel frequency;
   a combiner to combine the first and L second weighted frequency domain symbols into a combined frequency domain symbol; and
   a remodulator to remodulate the combined frequency domain symbol to a time domain symbol.

13. The system of claim 12, wherein the first mixing signal and the second mixing signal are derived from a common oscillator/reference.

14. The system of claim 13, wherein a sampling clock of the first tuner and a sampling clock of the second tuner are derived from the same oscillator/reference.

15. The system of claim 12, further comprising a digital baseband demodulator to receive the time domain symbol and to convert the time domain symbol into a plurality of sub-carriers, demodulate the plurality of sub-carriers, and perform symbol decoding to obtain an audio output, wherein the first and second tuners, the combiner and the remodulator are configured on a first semiconductor die and the digital baseband demodulator is configured on a second semiconductor die.

* * * * *

UNITED STATES PATENT AND TRADEMARK OFFICE
CERTIFICATE OF CORRECTION

PATENT NO. : 9,001,945 B2  
APPLICATION NO. : 13/162164  
DATED : April 7, 2015  
INVENTOR(S) : Javier Elenes and Lokesh Duraiappah

Page 1 of 1

It is certified that error appears in the above-identified patent and that said Letters Patent is hereby corrected as shown below:

In the Claims

Column 10, Claim 5:
Line 65, "the first and second the" should be --the first and the second--

Signed and Sealed this
Eleventh Day of August, 2015

Michelle K. Lee
*Director of the United States Patent and Trademark Office*